US010479016B2

(12) United States Patent
Motosko et al.

(10) Patent No.: US 10,479,016 B2
(45) Date of Patent: *Nov. 19, 2019

(54) POLYCARBONATE PANEL HAVING SHALLOW BENDS

(71) Applicants: Stephen J. Motosko, Sarasota, FL (US); Catherine Motosko, Sarasota, FL (US); Stephen Motosko, III, Sarasota, FL (US)

(72) Inventors: Stephen J. Motosko, Sarasota, FL (US); Catherine Motosko, Sarasota, FL (US); Stephen Motosko, III, Sarasota, FL (US)

(*) Notice: Subject to any disclaimer, the term of this patent is extended or adjusted under 35 U.S.C. 154(b) by 116 days.

This patent is subject to a terminal disclaimer.

(21) Appl. No.: 15/006,831

(22) Filed: Jan. 26, 2016

(65) Prior Publication Data
US 2016/0214307 A1    Jul. 28, 2016

Related U.S. Application Data

(60) Provisional application No. 62/107,841, filed on Jan. 26, 2015.

(51) Int. Cl.
*B29C 51/08* (2006.01)
*B29K 69/00* (2006.01)
*B29C 53/24* (2006.01)
*B29C 51/42* (2006.01)
*B29C 51/26* (2006.01)
(Continued)

(52) U.S. Cl.
CPC ............ *B29C 51/082* (2013.01); *B29C 51/16* (2013.01); *B29C 51/264* (2013.01); *B29C 51/421* (2013.01); *B29C 51/46* (2013.01); *B29C 53/24* (2013.01); *E04C 2/20* (2013.01); *E04C 2/322* (2013.01); *E04C 2/328* (2013.01); *E04C 2/50* (2013.01); *E06B 9/02* (2013.01); *B29C 51/445* (2013.01); *B29K 2023/06* (2013.01); *B29K 2069/00* (2013.01); *B29L 2009/00* (2013.01); *B29L 2016/00* (2013.01); *E04H 9/14* (2013.01); *E06B 2009/005* (2013.01); *Y02A 50/14* (2018.01)

(58) Field of Classification Search
None
See application file for complete search history.

(56) References Cited

U.S. PATENT DOCUMENTS 2,055,348 A    9/1936  Hansen
2,244,136 A    6/1941  Zercher
(Continued)

OTHER PUBLICATIONS

Sabic Innovative Plastics, Lexan Sheet Processing Guide, 2009.*
Polymer Plastics Corporation, Lexan Polycarbonate (Year: 2002).*

*Primary Examiner* — Jeffrey M Wollschlager
*Assistant Examiner* — Armand Melendez
(74) *Attorney, Agent, or Firm* — Dinsmore & Shohl LLP

(57) ABSTRACT

A panel having a base portion having at least one sidewall extending therefrom, the sidewall extending away from the base portion at a first predetermined angle, the first predetermined angle formed by a die having a second predetermined angle, the second predetermined angle being 1 to 12 degrees smaller as compared to the first predetermined angle so as to overbend the panel during the forming process, the panel relaxing to the first predetermined angle after the panel as entirely cooled after the forming process.

7 Claims, 7 Drawing Sheets

(51) Int. Cl.
*B29C 51/46* (2006.01)
*B29C 51/16* (2006.01)
*E04C 2/20* (2006.01)
*E04C 2/32* (2006.01)
*E06B 9/02* (2006.01)
*E04B 5/02* (2006.01)
*E04H 9/14* (2006.01)
*B29L 9/00* (2006.01)
*E06B 9/00* (2006.01)
*B29L 16/00* (2006.01)
*B29C 51/44* (2006.01)

(56) References Cited

U.S. PATENT DOCUMENTS

| | | | |
|---|---|---|---|
| 2,555,329 A | 6/1951 | Foster | |
| 4,450,706 A * | 5/1984 | Engelmohr | B21D 13/02 378/149 |
| 5,681,302 A * | 10/1997 | Melbye | A61F 13/15593 604/373 |
| 5,958,603 A * | 9/1999 | Ragland | B60R 13/08 428/595 |
| 6,131,354 A | 10/2000 | Thompson | |
| 6,585,208 B1 | 7/2003 | Fraser | |
| 7,337,582 B1 | 3/2008 | Klotz | |
| 8,082,706 B2 | 12/2011 | Myny et al. | |
| 2002/0112811 A1* | 8/2002 | Beauvois | B21D 13/02 156/199 |
| 2006/0012075 A1* | 1/2006 | Spengler | B29C 43/36 264/320 |
| 2013/0216744 A1* | 8/2013 | Liao | B32B 7/12 428/34.5 |
| 2014/0018502 A1* | 1/2014 | Sherga | C08L 33/20 525/184 |
| 2014/0157856 A1* | 6/2014 | Chin | B21D 13/02 72/375 |
| 2014/0186481 A1* | 7/2014 | Lee | B29C 51/04 425/395 |
| 2016/0067756 A1* | 3/2016 | Hirata | B21K 23/00 72/352 |
| 2016/0214307 A1* | 7/2016 | Motosko | B29C 51/082 |

* cited by examiner

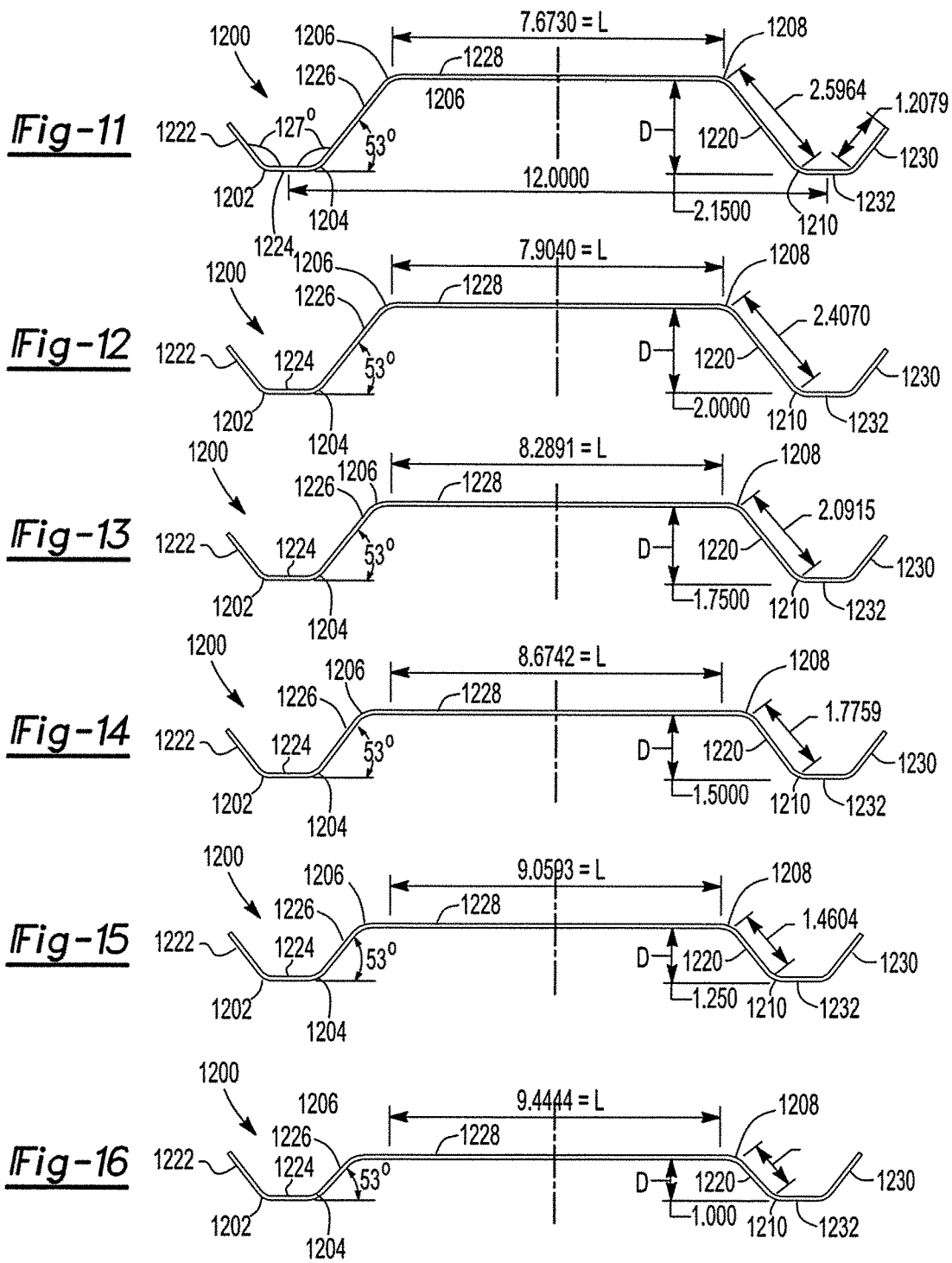

POLYCARBONATE PANEL HAVING SHALLOW BENDS

CROSS-REFERENCE TO RELATED APPLICATIONS

This Application claims the benefit of U.S. Provisional Application 62/107,841 filed on Jan. 26, 2015, the contents of which are incorporated herein in its entirety.

TECHNICAL FIELD

The present application relates generally to panels having a corresponding method for bending panels. More particularly, the present application relates to a panel having bends formed by overbending methods.

BACKGROUND

Polycarbonate panels for covering a window or other opening to a window to prevent storm damage are known. These panels are commonly created by extruding a plastic or similar material to form a corrugated panel. These panels are highly corrugated resulting in reduced strength and resiliency.

Corrugated metal panels, versus flat metal panels, add strength and resiliency to the panels in the event of high winds, rain, sleet, and debris during a storm. These panels are typically affixed over a window or other building opening to resist the wind, rain, sleet, and debris during a storm. The corrugated panels may be fixed or removable over the building openings.

Thermoforming is also a known method of forming a corrugated panel for a hurricane protection system. However, Thermoforming required high temperatures (250 degrees or more) and does not provide for allowing application or installation of any protection layer.

Accordingly, there exists a need in the art to provide a polycarbonate panel having sufficient resiliency and strength to withstand a storm while simultaneously minimizing waste during the manufacturing process.

SUMMARY

A panel having a base portion having at least one sidewall extending therefrom, the sidewall extending away from the base portion at a first predetermined angle, the first predetermined angle formed by a die having a second predetermined angle, the second predetermined angle being 1 to 12 degrees smaller as compared to the first predetermined angle so as to overbend the panel during the forming process, the panel relaxing to the first predetermined angle after the panel as entirely cooled after the forming process.

In one embodiment, the panel includes at least four bends, the bends spaced apart along the panel, the bends forming a predetermined length and a predetermined depth of the panel, the predetermined length being greater than the predetermined length. In typical embodiments, the panel is made of a polycarbonate material. A polyethylene film may be formed onto an outer surface of the polycarbonate panel, the polyethylene film formed onto the outer surface of the polycarbonate panel during the normal forming and bending process.

In other embodiments, the panel is a triangular panel where the sidewall is an edge portion of the triangular panel.

In some embodiments, the base portion has a predetermined length and the sidewall has a predetermined height, the predetermined height being greater than the predetermined length. In this embodiment, the predetermined length may be at least three times greater than the predetermined length.

A method may be used to form the panel such as described above. The method includes the steps of cutting the panel to the final predetermined length, heating, cooling and/or plasma treating the panel and forming the panel by bending the panel in the die. In some embodiment, the panel is over bent by 1 to 12 degrees during forming.

In an additional embodiment, an apparatus is used to form the panel ad described above using the method described above. The apparatus includes a die. The die having predetermined angles 1 to 12 degrees greater than the desired final angles of the panel. The die is generally U-shaped. The interior of the die having a plurality of angled portions to form the generally U-shaped die.

The die may include a lower portion and two angled sidewalls extending away from the lower portion, the angled sidewalls having a predetermined angle with respect to the lower portion of 1 to 12 degrees greater than the desired final angles of the panel. The die may further include a biasing member where the biasing member is positioned below the lower portion of the die so as to exert a force against the lower portion of the die. In some embodiments, the lower portion is resilient so as to flex when receiving a force from the biasing member. The die may includes sub-molds and/or a corner pocket to facilitate overbending and forming. Additionally, a control unit may be used to automatically adjust the angle and/or dimensions of the die prior and during forming.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 11 illustrates a cross-sectional view of the panel of the present embodiment having an upper panel with a dimension of 7.6730 inches;

FIG. 12 illustrates a cross-sectional view of the panel of an alternative embodiment having an upper panel with a dimension of 7.9040 inches;

FIG. 13 illustrates a cross-sectional view of the panel of an alternative embodiment having an upper panel with a dimension of 8.2891 inches;

FIG. 14 illustrates a cross-sectional view of the panel of an alternative embodiment having an upper panel with a dimension of 8.6742 inches;

FIG. 15 illustrates a cross-sectional view of the panel of an alternative embodiment having an upper panel with a dimension of 9.0693 inches;

FIG. 16 illustrates a cross-sectional view of the panel of an alternative embodiment having an upper panel with a dimension of 9.0693 inches;

DETAILED DESCRIPTION OF THE PREFERRED EMBODIMENTS

The panel of the present invention includes a predetermined bend, or plurality of bends, formed in a polycarbonate panel. The panel is formed for use of covering an opening of a building (i.e. a window) to protect the opening from wind, rain and debris during a storm. The panel includes at least two shallow bends significantly smaller and shallower as compared to the a typical corrugated bend of the prior art.

The present invention yields dramatically unexpected results as compared to the prior art. In sharp contrast to metal panels where significant corrugation is preferred, minimal corrugation is dramatically preferred in polycarbonate panels. The current industry standard is to form polycarbonate panels using the same dimensions and amount of corrugations as the standard metal panels. However, the present inventions provides for an improved panel using dramatically minimized total surface are of the panel by minimizing the frequency of bends in the finished panel as well as significantly decreasing height and increasing spacing of the bends in the panel (while still maintaining compatibility with existing connection hardware). This improved panel results in increased strength and resiliency of the polycarbonate panel while simultaneously reducing cost and production waste.

In one method of manufacturing, the panel is extruded to achieve the desired dimensions. In another embodiment, a flat panel is first used and is bent to achieve the desired dimensions. Overbending may be used to achieve the finished desired angle and dimensions by over bending the polycarbonate panel by 1 to 12 degrees over the finished desired angle. Heating and/or cooling may be used to adjust the temperature to a temperature of approximately 100 to 110 degrees. Stretching occurs between the press which increases the strength of the polycarbonate panel thus improving performance. Stretching may also occur at the sub-molds or at the corner pockets and corresponding protrusions. Furthermore, stretching can (optionally) occur in both the X and Y directions (respective to a normal plane) when the panel is placed in the press. To achieve this multi-directional stretching, clamps are attached to the panel. The clamps are attached to hydraulic cylinders and the panel is pulled. After this pulling occurs, the press then comes down to finalize forming.

Figure 2:
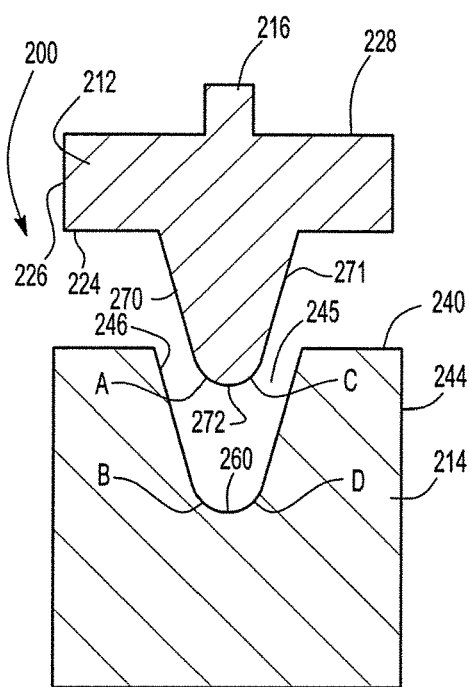
FIG. 2 illustrates a cross-sectional view of the press of an alternative embodiment of the present invention.
Figure 2A:
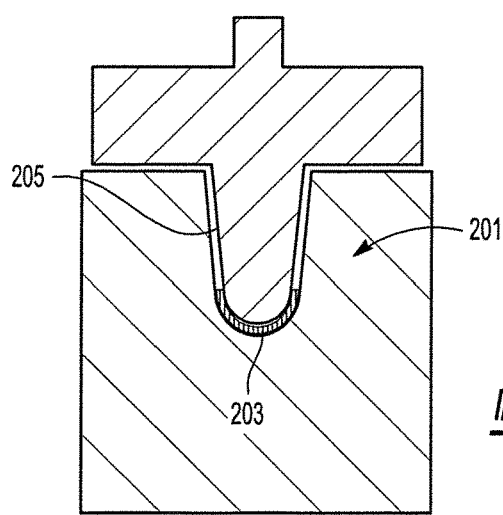
FIG. 2A illustrates the stretch and pinch of the panel between the die as illustrated in FIG. 2.

This stretching is illustrated at points A and B & C and D of FIG. 2. Please note that the same stretching principal can be applied to any of the dies illustrated herein. Specifically, in the embodiment as illustrated in FIG. 2, the panel is both stretched and pinched to form a greater strength panel. The stretching and pinching takes place at the bottom of the die. In this embodiment, pinching takes place just above the bottom of the bend and then stretching takes place. By way of example, points A and B of FIG. 2 pinch on one side the C and D on the other. This pinch and stretch forming helps to set the plastic in the new shape. It also makes it stronger, tougher, and more resilient. By further way of example, an sample panel produced from the die of FIG. 2 is illustrated in FIG. 2B. The panel 201 includes a thinned portion 203 with sidewalls 205. The pinch and stretch method makes the thinned portion 203 significantly stronger, tougher and more resilient since it alters the molecular structure of the polycarbonate panel.

A flat piece of polycarbonate material is first cut to the desired finished size and the pressing occurs after the cutting to reduce waste. This allows for customization of the panel size to the user. Rolls of polycarbonate material are obtained in 450 to 650 feet lengths. These rolls are obtained when the polycarbonate is in a flat configuration. The polycarbonate material is then cut to the desired finished size to accommodate the window or other opening within a building and customized to the specific size. Cutting before forming provides for dramatically reduced waste as compared to cutting the panel after the corrugation forming process. Waste on shorter length materials is reduced in the 8 to 10% range, while waste of the 400 to 650 foot rolls is reduced to nearly zero.

FIGS. 12-17 illustrate a panel 1200 which includes a plurality of radiused portions 1202, 1204, 1206, 1208, 1210, 1212. A plurality of generally planar surfaces 1222, 1224, 1226, 1228, 1220, 1232, 1230 are also provided between the radiused portions. An angle of 127 degrees is achieved between the panels, such as illustrated in FIGS. 12-17. This angle can vary slightly between 100-150 degrees.

Panel 1228 varies in length between 7.6730-9.4444 inches in length, as illustrated in FIGS. 12-17. However, this length may further vary between 5-15 inches in length to further reduce weight and to improve resiliency and strength. The amount of deflection that a hurricane panel has on impact or design pressures is crucial. Polycarbonate panels react differently from metals, such as steel or aluminum. Polycarbonate will deflect and return back to the original shape. Since there is less material to stretch out under pressure, a lower wave height may reduce deflection at the same impact or design pressure. Providing for a panel with fewer and shallow bends using overall less material as compared to the prior art results in a significantly more resilient panel.

The final panel may also include aperture and/or apertures with grommets to reinforce the apertures.

Figure 17:
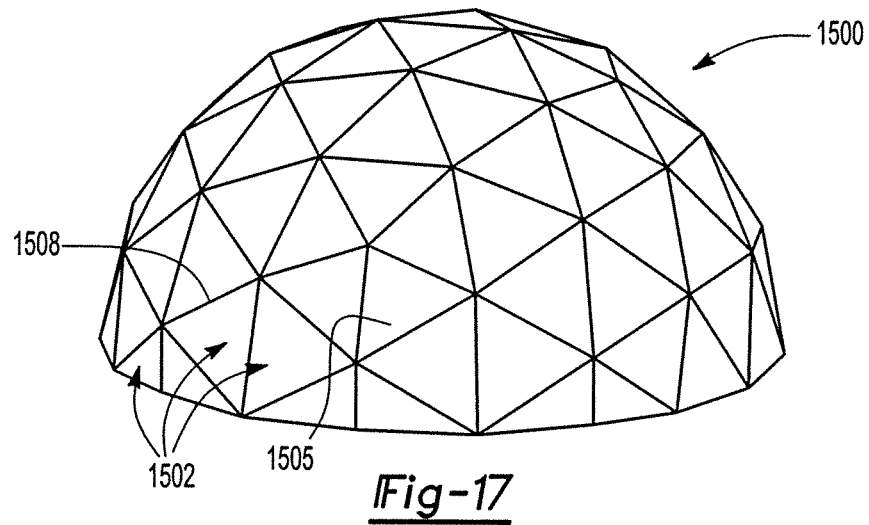
FIG. 17 illustrates a perspective view of a geometric dome in accordance with one or more embodiments of the present application.

The present invention is best achieved with the least amount of panel surface as possible. While some bend is typically required, a flat polycarbonate panel may also be provided. In best embodiments, a shallower the bend and the fewer the bends results in the best performance of the panel. Having a minimal number of small bends results in the least total surface area of the panel, this resulting in less material to be deflected if debris (or wind) contacts the panel during a storm. With this logic, the panel as illustrated in FIG. 17 exhibits the best performance of deflection and resilience using a polycarbonate panel. Other embodiments using a panel having a height of less than 1 inch may also be used.

FIG. 11 illustrates a cross-sectional view of the panel of the present embodiment having an upper panel with a dimension of 7.6730 inches. FIG. 12 illustrates a cross-sectional view of the panel of an alternative embodiment having an upper panel with a dimension of 7.9040 inches. FIG. 13 illustrates a cross-sectional view of the panel of an alternative embodiment having an upper panel with a dimension of 8.2891 inches. FIG. 14 illustrates a cross-sectional view of the panel of an alternative embodiment having an upper panel with a dimension of 8.6742 inches. FIG. 15 illustrates a cross-sectional view of the panel of an alternative embodiment having an upper panel with a dimension of 9.0693 inches. FIG. 16 illustrates a cross-sectional view of the panel of an alternative embodiment having an upper panel with a dimension of 9.0693 inches.

The panels of FIGS. 11-16 may also be fabricated using the following discussed method, also illustrated and described in FIGS. 1-10. Any of the methods, procedures or apparatuses discussed in the following may be applied to the panels as shown in FIGS. 11-16, and as discussed above.

FIGS. 1, 2, 3, and 5 illustrate various embodiments of the press having different angles. Now in reference to FIG. 1. The die 100 includes a first portion 112 and a second portion 114. The first portion, or upper portion, includes an upper end 116 and a lower end 118. The upper end 116 is configured to connect to a machine or apparatus to hold the first portion 112. The upper portion 116 of the first portion 112 of the die 100 includes an upper generally planar portion 128 and a side portion 126. These portions are also configured to connect to a machine for pressing. A lower middle portion 124 is also configured to connect to the apparatus. Surfaces 122, 132 are adapted to form the angled surfaces of the panel. These angles of the die 100 are configured to over bend the panel by 1 to 12 degrees (typically 1 to 3 degrees) to achieve the exact desired finish angle of the corrugated panel. The over bending of 1 to 12 degrees compensates for the polycarbonate cooling and resting thus resulting in a more accurate finished panel. The panel must be let to cool (for up to 24 hours) for the panel to achieve the desired final angle. The panel should be cooled to ambient or room temperature before shipping or use.

The second portion 114 includes an upper portion 140 and a lower portion 142. A side portion 144 is also provided configured allowing the pressing apparatus to hold the second portion 114. An interior portion 162 is provided having a surface 148 configured to connect with the surface 132 of the first portion 112. Again, over bending of 1 to 12 degrees is provided in the die to facilitate a correct finished angle of the panel.

Figure 10:
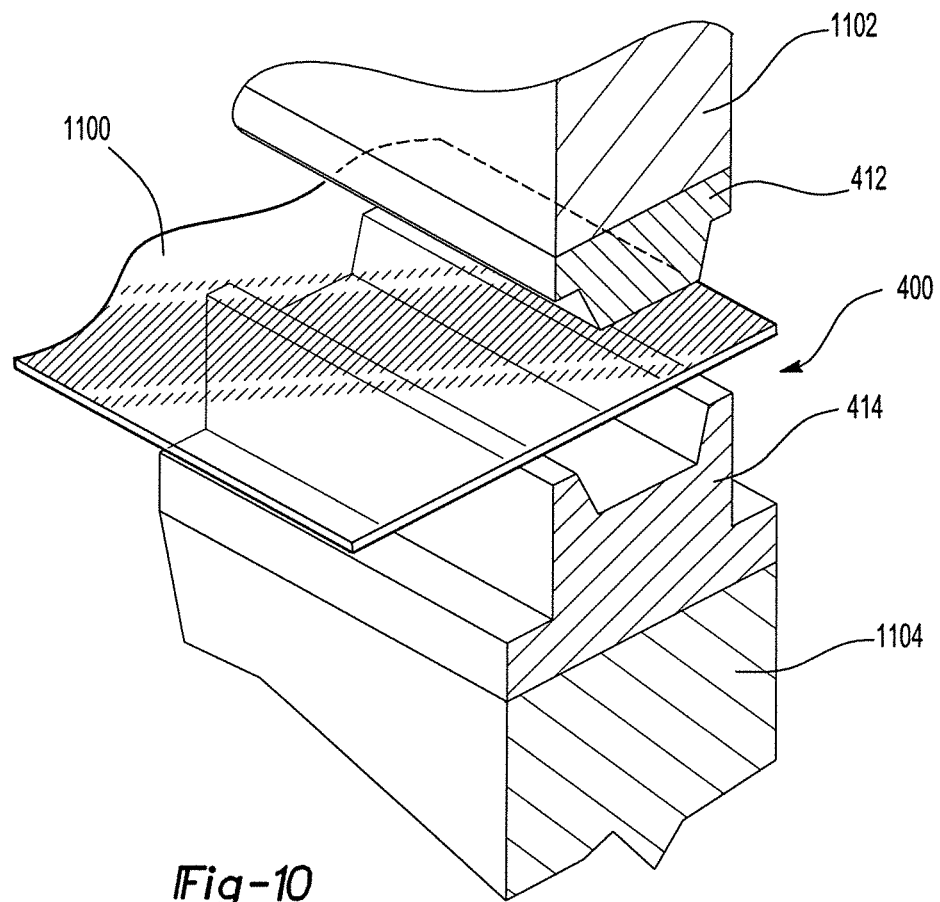
FIG. 10 illustrates the panel being inserted between the die portions before forming.

As shown by FIG. 10, the apparatus of the present invention is generally comprised of a first part 1102 and a second part 1104 operable to be pressed together to form the corrugated panel. The flat panel 1100 is inserted manually or otherwise into the press and an actuator presses the first portion and the second portion together to form the corrugated panel. The press or die is installed into a machine, such as shown in FIG. 10, and is formed with the help of a user.

A spring plate 150 is provided having an interior cavity 152 and a spring 154. The spring plate 150 is provided having a pressing member 156 in connection with the surface 148 of the second portion 114. The spring plate and spring apparatus is adapted to facilitate removal of the panel from the die 100 after the pressing is complete. In alternative embodiments, the spring 154 may be a hydraulic actuator or other form of spring. The second portion 114 of the die 100 further includes interior surfaces 146 operable to connect with the outer angled surface 122 of the first portion 112 of the die 100. The die 100 also includes sub-molds or corner pockets 130. The corner pockets 130 are provided at a middle lower portion of the first portion 112 of the die 100 which corresponds to a protrusion 131 of the second portion 114 of the die 100. These corner pockets facilitate stretching of the polycarbonate within the die 100 during pressing. It should be noted that the die may have a plurality of protrusions and depressions such as shown at 130, 131 (sub-molds) to achieve a corrugated polycarbonate panel in less time. A die having a plurality of sub-molds will have the same arches, geometry, corner pockets, etc. as adjacent sub-molds.

Figure 1:
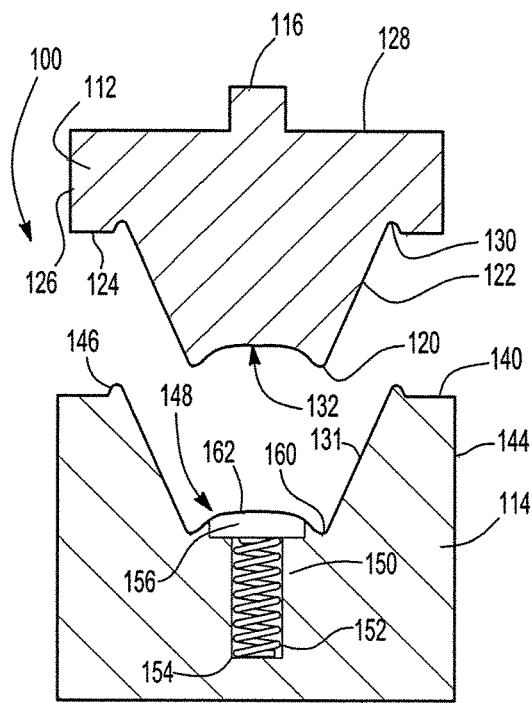
FIG. 1 illustrates a cross-sectional view of a first embodiment of the present invention.

The spring plate 150 is operable to create an opposite force of the mold against the polycarbonate panel during the forming process to align the panel and keep the panel from slipping. The protrusions or sub-molds 130, 131 also facilitate in aligning the panel and keeping the panel from slipping. The spring plate 150 is used in connection with the arch as illustrated at surface 148 to create a planar/flat portion of the finished corrugated polycarbonate panel. As shown in FIG. 1, the at least two corner pockets and corresponding protrusions 130, 131 help maintain a consistent angle on the corrugated polycarbonate finished panel. Typically, different length panels require different tonnage to achieve the same angle. The sub-molds 130, 131 of FIG. 1 work like an air bending acute die to achieve consistent bends over the varying length panels at the same tonnage. The sub-molds 130, 131 achieve a smooth bend and curve around the bend by over bending at the corners. The sub-molds 130, 131 also facilitate stretching to improve resiliency and strength of the finished panel.

The apparatus and method includes inserting the panel into the assembly one or more times to achieve the desired radius and profile. Over bending of the polycarbonate is required to achieve the desired final angle. By way of example, a bend in the die 100, or any of the other dies mentioned below, of 85 degrees is necessary to achieve a final radius of 60 degrees in the panel. Greater bending angles can be achieved by pre-arching the polycarbonate in the opposite direction but not to the point that it will permanently set. The pre-arch, as illustrated by surface 148 of FIG. 1, section will snap and return the flat, planar portion due to over bending in the polycarbonate. Alternatively, to get to 90 degrees, two 45 degree bends may be performed to achieve the final 90 degree bend.

FIG. 2 illustrates an alternative embodiment to the die 100 of FIG. 1. The die 200 includes a first portion 212 and a second portion 214. The first portion 212 includes an upper first end 216 having a configuration adapted to connect to the pressing apparatus 228. Side portions and middle lower portions 224, 226 are also provided to assist in the forming of the polycarbonate panel. The first portion 212 includes an angled side wall 270 and a rounded tip 272 adapted to form a one bend portion of a polycarbonate panel. A second portion 214 is provided having upper portions 240 adapted to connect to the portion 224 to form generally planar portions of the polycarbonate panel. The second portion 214 includes side and lower portions 244, 242 adapted to connect to the forming apparatus. The indentation 245 is adapted having an angled side wall 246 and a radiused portion 260 adapted to connect to the protrusion 271 of the first portion 212.

Figure 4:
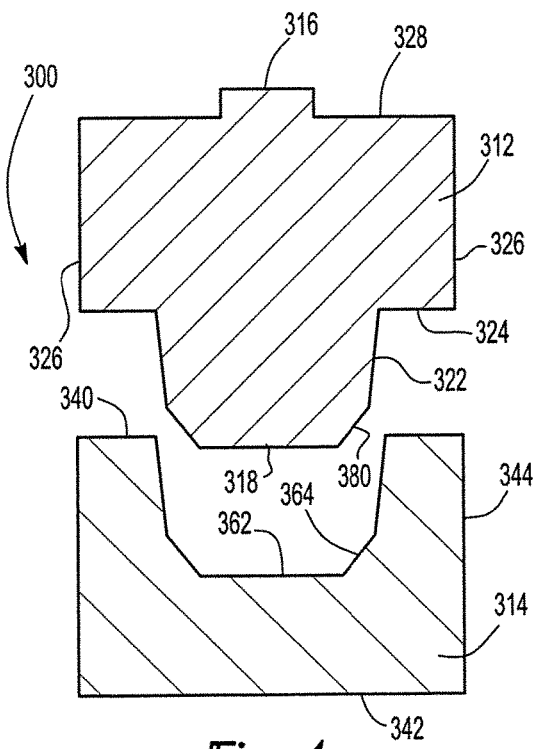
FIG. 4 illustrates yet another alternative embodiment of the press of the present invention.
Figure 5:
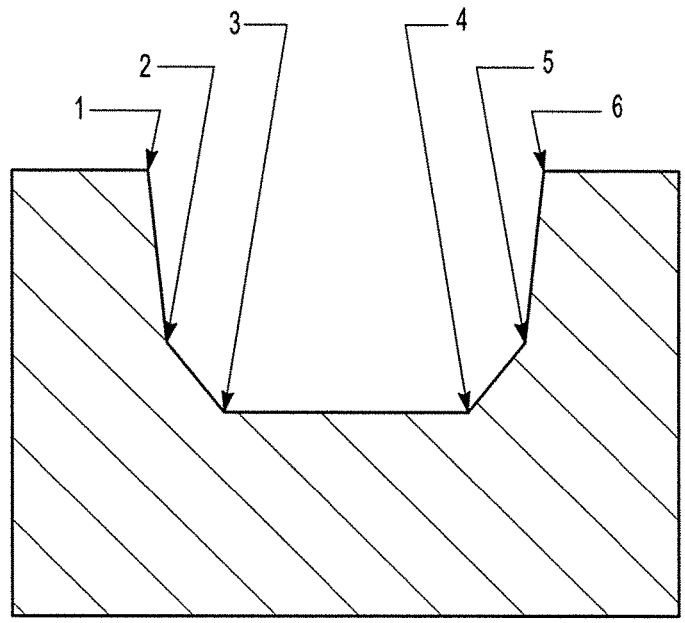
FIG. 5 illustrates a cross-sectional view with force arrows illustrating the pressing during the forming process of the corrugated panel.

FIG. 4 illustrates yet another alternative embodiment of the die 100. A die 300 is provided having a first portion 312 and a second portion 314. The first portion 312 includes an upper portion 316 having a generally planar upper surface 328. A side wall 326 is provided. A middle lower generally planar surface 324 is adapted to produce the generally planar portions of the finished panel. Angled side walls 322, 380 are provided to form the generally radiused portion of the finished panel. A lower surface 318 is adapted to provide a lower generally planar portion of the finished panel. The second portion 314 includes an upper surface 340 adapted to work in connection with the surface 324 of the first portion 312 to create a generally planar surface of the finished panel. Lower and side portions 342 and 344 are adapted to connect to the forming apparatus. The second portion 314 includes interior angled surfaces 364, 368 to provide the angled surfaces and radiused surfaces of the finished panel. The lower surface 362 is adapted to connect to the planar portion 318 of the first portion of the die 300.

Figure 3:
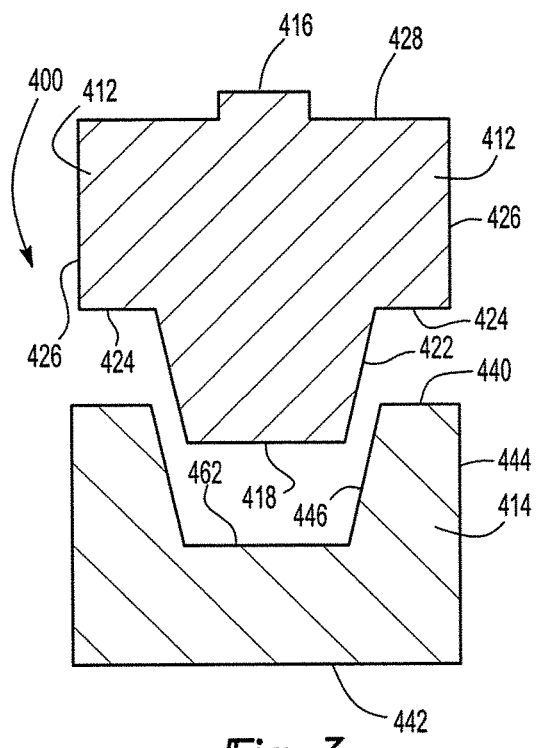
FIG. 3 illustrates a cross-sectional view of yet another alternative embodiment of the present invention.

FIG. 3 illustrates yet another alternative embodiment of the die 100. A die 400 is provided having a first portion 412 and a second portion 414. The first portion 412 includes an upper portion 416 having a generally planar upper surface 428 both adapted to connect to the apparatus for forming. A side wall 426 is also provided. A middle lower wall 424 and a lower wall 418 are adapted to rest adjacent to/connect to the upper surface 462 and 440 of the second portion 414. The lower portion 414 includes a side wall 444 and a lower wall 442 adapted to connect to the apparatus for forming.

The method includes the steps of cutting a roll of polycarbonate material to the finished size of the shutter to cover a window or other opening of a building. The method then includes the step of heating or cooling the panel and bending the die to the desired stable temperature. The temperature increase/decrease will not drastically but rather only vary within 5 to 30 degrees of the ambient temperature in an effort to keep the system stable. Other methods require increasing the polycarbonate temperature up to 250 degrees and dried of all moisture before forming. The present invention only requires the temperature to be just above ambient at 100 to 110 degrees Fahrenheit. Slightly warming ensures consistent bending. Cold bending of the polycarbonate can cause fractures in the bent area. Furthermore, it is recommended that the material only be radiused to 100 times its thickness.

The present invention only requires a stable temperature of 100 to 110 degrees Fahrenheit. Since the angle of the bend only partially depends on the plastic temperature, the present invention only requires a minimal temperature increase.

The dies as illustrated in FIGS. 1, 2, 3, and 5 may also be heated or cooled. The method of the present invention does not require drying to remove moisture before forming since the temperature increase is minimal. The method may further include the steps of incorporating a protective polyethylene layer on both sides of the finished panel. The polyethylene layer is provided on the polycarbonate material before forming. Since the temperature increase is so minimal, the forming process between the dies does not damage the polyethylene layer. The polyethylene layer not only protects the polycarbonate during processing, it also protects the polycarbonate during shipping and installation. Without the polyethylene layer, the polycarbonate may become scratched and create an unappealing look to the user. The polyethylene layer may be left on during installation and use or may also be removed before installation and use.

The method may then include the step of plasma treating the surface of the area to be bent before the forming. The plasma surface treating takes place before the bending and before forming changes the surface tension as well as super cleaning the area allowing the empty peaks and valleys to fold within each other and create a fracture free reinforced corner.

The inclusion of a plasma process before, during, or after the die forming process is advantageous. Gas plasma allows for molecular engineering of materials to impart unique characteristics and surface properties without affecting the bulk properties of the whole material. The use of plasma in the forming of polycarbonate panels changes the surface characteristic such as changing in biocompatibility, surface energy, morphology, texture, and absorption.

The next step of the method includes compressing to form ribs or corrugation of the surface of the polycarbonate. The step includes compression of the bent area completely around the radius and/or in specific areas to create one or more compressed ribs thus creating the corrugated look. The compressing/bending requires 50 to 100 tons of pressure. The pressure will add additional heat to the bent/stretched area. This process and method creates a fracture free reinforced bent area. The maximum angle before fractioning and weakening is dependent on the material temperature, die temperature, compressing temperature, thickness of the material, and final desired angle.

The method of the present invention allows a user to make panels with any width panel, height of wave, width of wave, and frequency of the wave. Each of the dies as illustrated in FIGS. 1, 2, 3, and 5 may be adjusted by moving the various side panels and components of the die. Automatic adjustment is available for height of the wave (or corrugation) by the user inputting information into a computer connected to a controller. The controller then sends a signal to an actuator which adjusts the height of the bending portion (portion of a die). This automatic adjustment is available for the single punch formation of the panel (i.e. forming one bend at a time). The angles of the bend are controlled by the depth of the die or portion of the die. The user repeats the single punch (or bend) process until the entire panel is fully corrugated. The user can control the depth by means of a CNC controller (connected to a computer and a display screen).

Figure 6:
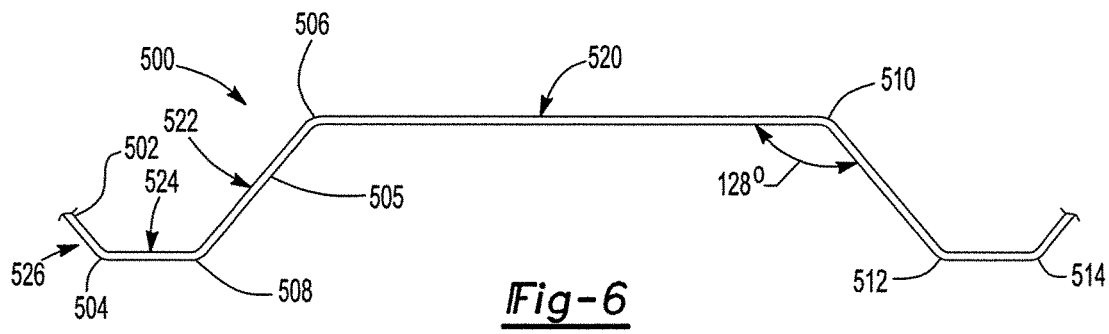
FIG. 6 illustrates a cross-section view of one embodiments of the corrugated panel.

FIG. 6 illustrates a cross-sectional view of two panels having different wavelengths. The panel 500 includes a plurality of radiused bends 504, 508, 506, 510, 512, 514. Each of these bends 128 is provided at a 128 degree angle. To achieve this 128 degree angle, the die must have an angle of 138 degrees plus. The panel 500 further includes a plurality of generally planar portions 502, 505 having generally planar surfaces 526, 522, 520. To achieve these planar portions and planar surfaces, the surfaces of the die may be slightly angled, such as illustrated in FIG. 1, to achieve the planar surface.

Figure 7:
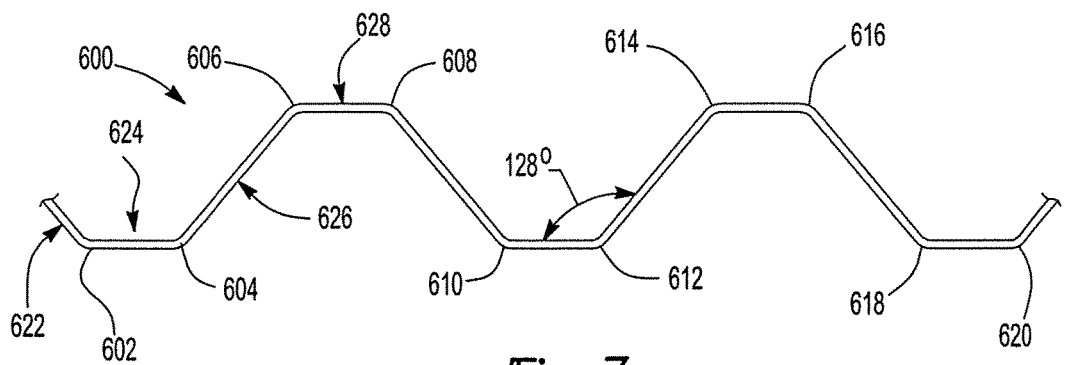
FIG. 7 illustrates an alternative embodiment cross-sectional view of the finished panel of the present invention.

FIG. 7 illustrates the panel 600 which includes a plurality of radiused portions 602, 604, 606, 608, 610, 612, 614, 616, 618. A plurality of generally planar surfaces 622, 624, 628 are also provided between the radiused portions. Again, an angle of 128 degrees is provided between each of these portions. Over bending, such as described above, is also required to achieve these final angles of the polycarbonate panel.

Figure 9:
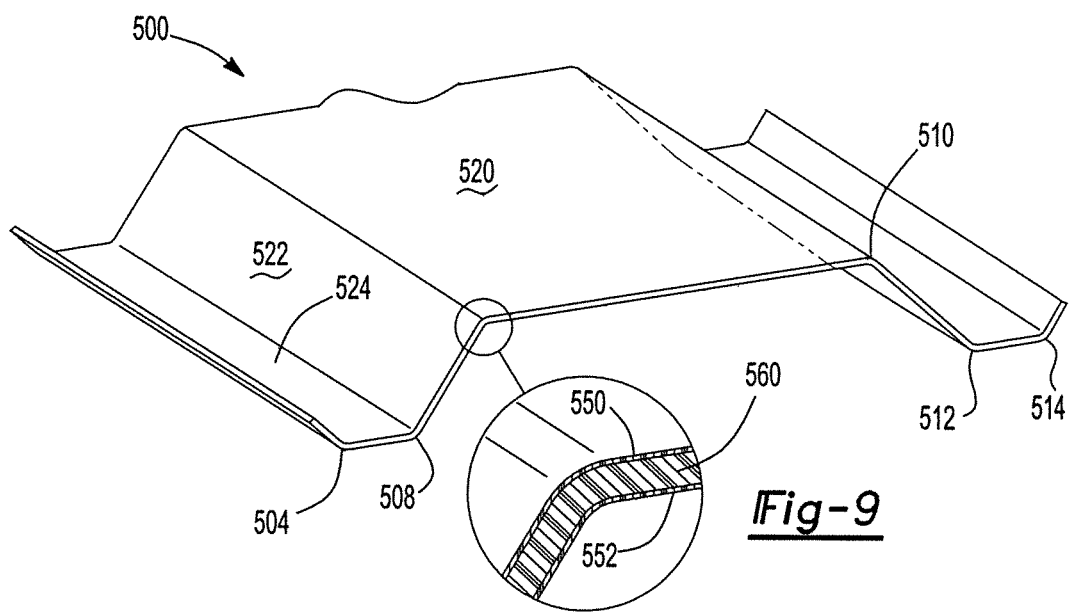
FIG. 9 illustrates the finished product of the corrugated panel, this panel may also contain apertures or grommets for mounting.

The amount of deflection that a hurricane panel, such as those illustrated in FIGS. 6, 7 and 9, has on impact or design pressures is crucial. Polycarbonate panels react differently from steel or aluminum. Polycarbonate will deflect and return back to the original shape. Since there is less material to stretch out under pressure, a lower wave height may reduce deflection at the same impact or design pressure.

The final panel may also include aperture and/or apertures with grommets to reinforce the apertures.

Figure 8:
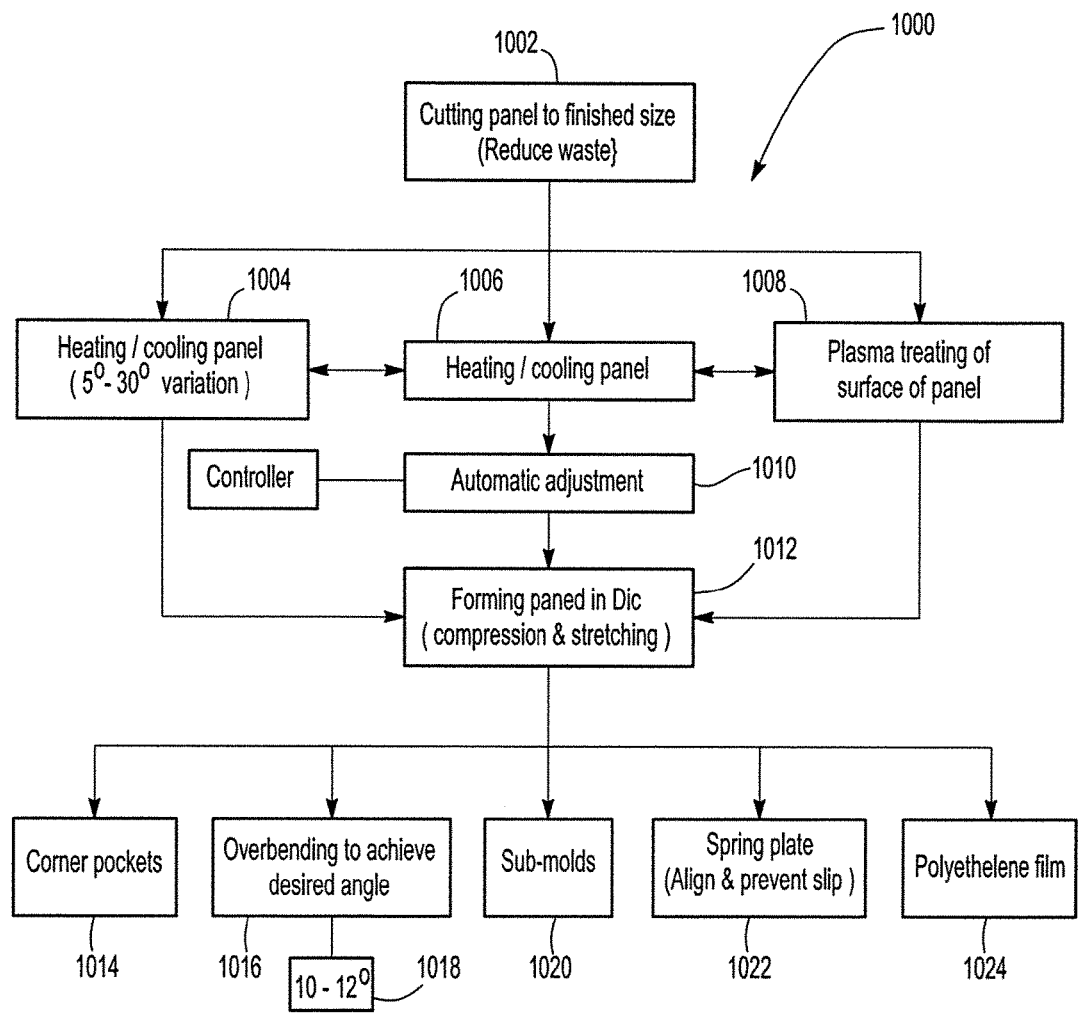
FIG. 8 illustrates the method of forming the corrugated panel.

FIG. 8 illustrates the method 100 of the present invention. The method includes the steps of cutting the panel 1002 to a finished size to reduce waste. The panel is cut from a roll of polycarbonate material ranging from 450 to 650 feet in length. The panel may also be cut from a 20 foot sheet. Waste may be reduced to essentially zero when cut from the 450 to 650 foot sheets. The method then includes the steps of heating or cooling the panel to 100 to 110 degrees (a 5 degree to 30 degree variation from ambient temperature which is illustrated at reference numeral 1004). Before or after that step at 1004 the die may be heated or cooled as illustrated at reference numeral 1006. The panel or die may be heated or cooled by electric strip heaters placed on or adjacent the panel or the die. Before or after steps 1004 or 1006, plasma treating 1008 of the surface of the panel may be performed. Before forming the die, automatic adjustment of the dies as illustrated in FIGS. 1, 2, 3, and 5 may be performed as illustrated at reference numeral 1010. The die is then formed at reference numeral 1012 which includes compression and stretching of the polycarbonate material. The die may be manually inserted into the apparatus by using a stop or guide to direct the user how far to insert the panel into the forming machine. The panel may be inserted into the machine a plurality of times to achieve the desired corrugated final product. The following steps may also be performed before or after one another. Forming corner pockets 1014, over bending 1016 to achieve a desired angle (where the over bending is between 1 and 12 degrees as illustrated at reference numeral 1018), creating submolds 1020, providing a spring plate to prevent slippage and to align as illustrated at reference numeral 1022, and also providing a polyethylene film or layer to provide protection to the polycarbonate material.

FIG. 9 illustrates a perspective view of the finished panel after the panel has been cooled. The panel includes the polyethylene film 550, 552 formed on the polycarbonate 560.

The above described method and apparatus is unique when used with polycarbonate and polyethylene film. Polycarbonate normally requires a temperature of over 250 degrees Fahrenheit to properly bend. The above mentioned method and apparatus do not require such a high temperature. This high temperature require expending extra energy and time for the panel and/or dies to reach such a high temperature. Overbending of the present invention does not require such a high temperature (the current method only requires a temperature of 100-110 degrees Fahrenheit). The lower temperature requirement, because of the overbending unique to polycarbonate, is less costly and time consuming to the user. Accordingly, this method and apparatus provided for unexpected results when used specifically with polycarbonate (and a polyethylene film).

The present apparatus and method allow the user to apply the film to the polycarbonate panel. Traditional stamping methods requires significantly higher temperatures (250 degrees or more). These traditional methods will melt the polyethylene film used for protection on the polycarbonate panel. Since the present invention utilizes overbending and only raising the temperature slightly (100-110 degrees Fahrenheit), the polyethylene film can be applied before forming. Accordingly, the present invention offers significant improvements over the prior art.

The overbending of the panel allows the user to use a lower temperature during forming. The overbending requires the die to be 1-12 degrees over the desired finished angle of the panel. After the panel is allowed to sit for 24 hours, the panel will reach its final predetermined dimension. By way of example, FIG. 3 illustrates a cross-sectional view of a die used in the present invention. The die 400 is has angles 1-12 degrees over the desired finished angle of the product panel. As shown by X, this angle is 1-12 degrees smaller than the finished product. X in FIG. 3 is 1-12 degrees smaller than the desired predetermined angle of the finished panel. Right after the panel comes out of the mold, the angles will be 1-12 degrees smaller than the ultimate finished product. After 24 hours allowing the panel to cool, the panel will have angles measuring to the predetermined angles (1-12 degrees greater than the angles of the die). Furthermore, the time delay (1 to 30 seconds) at the bottom of the stroke also allows for the polycarbonate panel to set. The finished predetermined angle being 1-12 degrees greater than the angle of the bend in the die.

Figure 18:
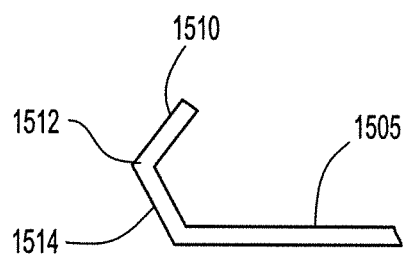
FIG. 18 illustrates a cross sectional view of one embodiment of a triangle panel in accordance with one or more embodiments of the present application.
Figure 19:
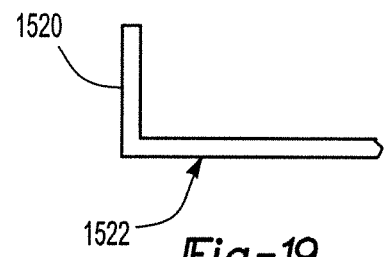
FIG. 19 illustrates an alternative cross sectional view of one embodiment of the triangular panel in accordance with one or more embodiments of the present application.
Figure 20:
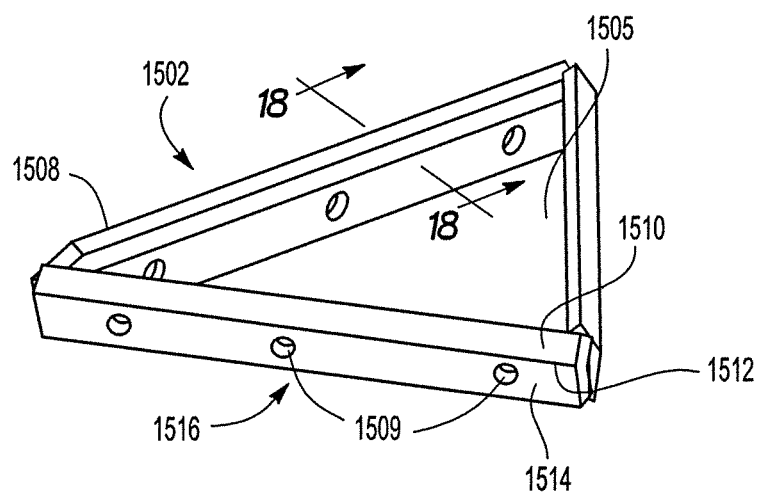
FIG. 20 illustrates an exemplary triangular panel used in the geometric dome in accordance with one or more embodiments of the present application.

In another embodiment, the same overbeing principals described above are applied to a triangular panel as illustrated in FIGS. 17-20. FIG. 17 illustrates a perspective view of a geometric dome 1500 in accordance with one or more embodiments of the present application. A plurality of panels 1502 of the geometric dome 1500 are connected together at the edges 1508. The edges 1508 may be straight (such as illustrated in FIG. 19) or have an angles bend such as illustrated in FIGS. 18 and 20.

FIG. 19 illustrates an alternative cross sectional view of one embodiment of the triangular panel in accordance with one or more embodiments of the present application. The cross section of FIG. 19 is a straight angle edge of a triangular panel, such as the triangular panel 1502. The triangular panel of FIG. 19 includes an outer surface 1522 and an edge 1520. The edge 1520, in the embodiment as shown in FIG. 19, is generally extending at a 90 degree angle from the surface 1522. Alternatively, the edge 1520 may extend at an angle away from the surface 1520 and may be overbent in accordance with the other embodiments described in the preceding.

FIG. 20 illustrates an exemplary triangular panel used in the geometric dome in accordance with one or more embodiments of the present application. The edges 1508 of the panel 1502 extend away from the base portion 1505 of the triangular panel 1502. In this embodiment, the edges includes bends in accordance with the cross sectional view as shown in FIG. 18 along the line 18-18. The bend 1512 is between the portions 1510 and 1514. In this embodiment, the edges include a plurality of apertures 1509. The apertures 1509 allow a plurality of panels to be connected together, such as illustrated in FIG. 17. The panels are connected at the edges by means of a bolt, screw or other similar fastener. Alternatively, the edges are connected together by an adhesive or ultrasonic welding.

In a typical embodiment, the triangular panels 1502 are made of a polycarbonate material. The panels 1502 may include a polyethylene layer formed to the panel during the forming process using a die, such as the die described and illustrated herein. The overbending method may also be used to form the bends in the triangular panel 1502.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method for forming multiple bends into a panel comprising the steps of:
   providing first and second opposing and elongated dies, the first die having in cross section a projecting profile and the second die a recessed profile extending between a pair of outer edge portions for receiving the projecting profile;
   heating a surface of at least one of the first and second dies to a temperature up to 110° F.;
   providing the panel of a polycarbonate material at an ambient temperature and advancing the panel to a first location between the first and second elongated dies so that a surface of the panel is placed into proximity with the heated surface, resulting in a temperature increase of the panel while retaining its structural rigidity;
   displacing the projecting profile into the recessed profile to compress a portion of the panel sandwiched between the dies and to initially deform the panel;
   pinching the sandwiched portion of the panel at first and second interior locations between the dies;
   forming the panel by stretching and further bending the panel in the die at the pinch locations to define a thinned portion of the panel and in order to alter a molecular structure of the panel between the pinch locations resulting in strengthening of the panel;
   separating the dies and subsequently advancing the panel to at least a second location and repeating of the steps of displacing, pinching and forming the panel in order to reform the panel to exhibit multiple strengthened bends.

2. The method of claim 1 further comprising the step of the panel being over bent by 1 to 12 degrees during forming.

3. The method of claim 1, further comprising the step of providing at least the projecting profile with a rounded bottom portion.

4. The method of claim 3, further comprising the step of configuring both the projecting and recessed profiles with opposing arcuate profiles.

5. The method of claim 3, further comprising the step of positioning the pinch points on opposite sides of the rounded bottom of the projecting profile.

6. The method of claim 1, further comprising the step of providing a polycarbonate roll of material and sectioning the roll material into individual panels.

7. The method of claim 1, further comprising the step of pre-applying a protective polyethylene layer to the panel prior to forming between the dies.

* * * * *